US008770652B2

(12) United States Patent
Hong et al.

(10) Patent No.: US 8,770,652 B2
(45) Date of Patent: Jul. 8, 2014

(54) UPPER VEHICLE BODY STRUCTURE OF VEHICLE WITH SUN ROOF

(71) Applicants: Hyundai Motor Company, Seoul (KR); Kia Motors Corporation, Seoul (KR)

(72) Inventors: Jang Won Hong, Ansan-si (KR); Ju Sik Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/714,167

(22) Filed: Dec. 13, 2012

(65) Prior Publication Data
US 2014/0070571 A1 Mar. 13, 2014

(30) Foreign Application Priority Data
Sep. 7, 2012 (KR) .................. 10-2012-0099480

(51) Int. Cl.
*B62D 27/04* (2006.01)
*B62D 25/02* (2006.01)

(52) U.S. Cl.
USPC ............ 296/187.05; 296/187.12; 296/203.03; 296/216.08

(58) Field of Classification Search
USPC .................. 296/216.06–216.09, 203.03, 210, 296/187.12, 216.01
See application file for complete search history.

(56) References Cited

U.S. PATENT DOCUMENTS

| 5,671,968 | A | * | 9/1997 | Masuda et al. ........... 296/187.12 |
| 6,474,724 | B2 | * | 11/2002 | Lemmon et al. ......... 296/187.05 |
| 6,475,937 | B1 | * | 11/2002 | Preisler et al. ................ 442/370 |
| 6,481,788 | B1 | * | 11/2002 | Moriyama et al. ....... 296/216.07 |
| 7,914,072 | B2 | * | 3/2011 | Queener et al. ................ 296/210 |
| 2010/0127532 | A1 | * | 5/2010 | Hosaka et al. ........... 296/193.06 |
| 2012/0153676 | A1 | * | 6/2012 | Shono ...................... 296/193.06 |

FOREIGN PATENT DOCUMENTS

| JP | 3196630 B2 | 6/2001 |
| JP | 3644401 B2 | 2/2005 |
| KR | 10 1999 0020482 A | 3/1999 |

\* cited by examiner

*Primary Examiner* — Dennis H Pedder
(74) *Attorney, Agent, or Firm* — Morgan, Lewis & Bockius LLP

(57) ABSTRACT

An upper vehicle body structure of a vehicle with a sun roof in which an edge of a roof panel at which the sun roof is installed may be connected to a center pillar positioned at a center among a plurality of pillars formed to extend in a height direction of the vehicle and arranged in a longitudinal direction of the vehicle, may include a ring reinforcement member attached to the roof panel so as to form a closed section with the roof panel, a gusset unit mounted under the center pillar and the ring reinforcement member, Wherein the sun roof may be connected to the gusset unit.

6 Claims, 6 Drawing Sheets

UPPER VEHICLE BODY STRUCTURE OF VEHICLE WITH SUN ROOF

CROSS-REFERENCE TO RELATED APPLICATION

The present application claims priority to Korean Patent Application No. 10-2012-0099480 filed on Sep. 7, 2012, the entire contents of which is incorporated herein for all purposes by this reference.

BACKGROUND OF THE INVENTION

1. Field of the Invention

The present invention relates to an upper vehicle body structure of a vehicle with a sun roof having improved strength of connection between a roof and a center pillar of a vehicle including a sun roof.

2. Description of Related Art

In general, a roof of a vehicle constitutes an upper portion of a vehicle room, is disposed in a longitudinal direction of the vehicle, and is connected to a plurality of pillars extending in a height direction of the vehicle to be supported.

In order to improve habitability of the vehicle room, a sun roof is installed in the roof, and the sun roof called a roof window includes an opening and a door opening/closing the opening in the roof.

When the opening is opened, an interior of the vehicle room communicates with the outside of the vehicle room through the opening, thereby giving openness to a passenger inside the vehicle room, and fresh outside air smoothly flows inside the vehicle room through the opening, thereby improving ventilation inside the vehicle room.

However, when the sun roof is installed in the roof, structural strength of the roof deteriorates, so that it is difficult to effectively respond to a side crash of the vehicle.

A method of connecting the sun roof with the roof and the pillars may be considered in order to complement a strength deterioration problem. However, in this case, there is difficulty because the method needs to simultaneously meet a free motion head foam (FMH) regulation for reducing head damage of a passenger if a crash of a vehicle occurs.

The information disclosed in this Background of the invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an upper vehicle body structure of a vehicle with a sun roof having advantages of effectively responding to a side crash by enhancing strength of connection between pillars and a roof of a vehicle and simultaneously meeting the FMH regulations.

In an aspect of the present invention, an upper vehicle body structure of a vehicle with a sun roof in which an edge of a roof panel at which the sun roof is installed is connected to a center pillar positioned at a center among a plurality of pillars formed to extend in a height direction of the vehicle and arranged in a longitudinal direction of the vehicle, may include a ring reinforcement member attached to the roof panel so as to form a closed section with the roof panel, a gusset unit mounted under the center pillar and the ring reinforcement member, wherein the sun roof is connected to the gusset unit.

A foaming pad is installed at a tip end of the gusset unit connected with the sun roof.

The gusset unit is mounted under the ring reinforcement member and the center pillar so as to overlap a connection portion at which an edge of the roof panel is connected with the center pillar.

The gusset unit may include an upper gusset mounted to the ring reinforcement member and the center pillar, and a lower gusset coupled to the upper gusset.

The upper gusset and the lower gusset are coupled to each other so as to form a closed section.

Each of the upper gusset and the lower gusset may include a plurality of beads formed in a longitudinal direction thereof.

The sun roof is fastened to the lower gusset by a coupling bolt to be connected to the lower gusset.

The center pillar may include a center pillar inner panel and a side outer reinforcement panel coupled outside the center pillar inner panel so as to form a closed section with the center pillar inner panel, wherein the upper gusset is mounted to the center pillar inner panel inside thereof, and wherein a headlining is installed at a lower portion of the lower gusset in the height direction of the vehicle, and a plurality of ribs is installed in the headlining.

Coupling holes are formed to the upper gusset and the lower gusset to communicate with each other when the upper gusset overlaps the lower gusset.

A foam pad is interposed between one tip end of the upper gusset and one tip end of the lower gusset, wherein the one tip end of the lower gusset is connected with the sun roof, and wherein the one tip end of the upper gusset is connected with the ring reinforcement member.

According to the upper vehicle body structure of the vehicle with the sun roof according to the exemplary embodiment of the present invention, the sun roof is connected to the gusset unit, the gusset unit including the upper gusset and the lower gusset coupled to each other so as to form the closed section is mounted to each of the ring reinforcement member and the center pillar, and the ring reinforcement member is mounted to the roof panel so as to form the closed section.

Accordingly, strength of the connection between the roof of the vehicle and the center pillar is enhanced and mounting strength of the sun roof is enhanced, so that deformation of the roof is suppressed when a side crash of the vehicle occurs, thereby effectively responding to the side crash.

The foaming pad is embedded in the tip end of the gusset unit connected with the sun roof to effectively absorb and decrease impact applied to a dummy in a crash test of a vehicle, so that it is possible to amicably meet the FMH regulations according to a decrease in a value of FMH head injury criterion (HIC), thereby improving passenger safety in crash situations.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
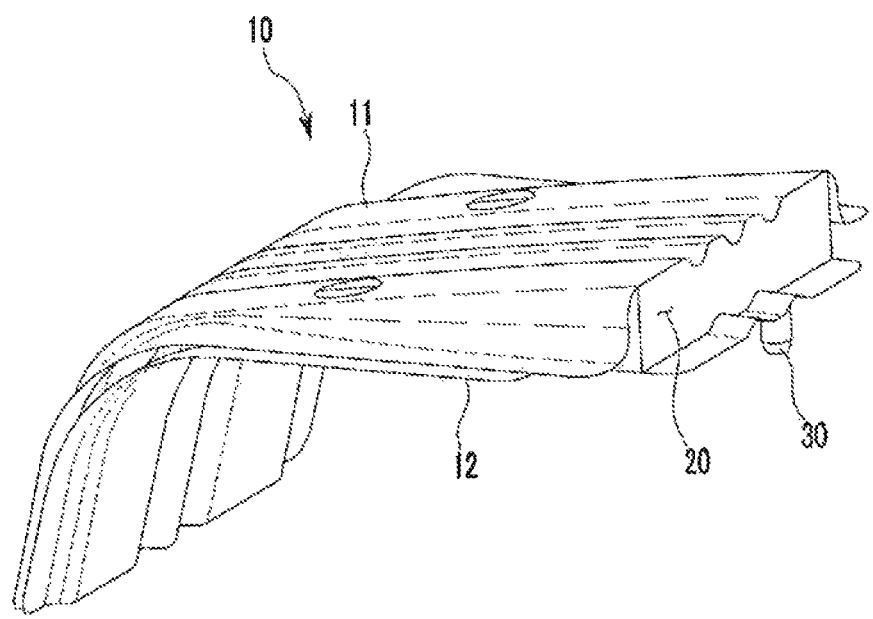
FIG. 1 is an exploded perspective view of a gusset unit according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Figure 2:
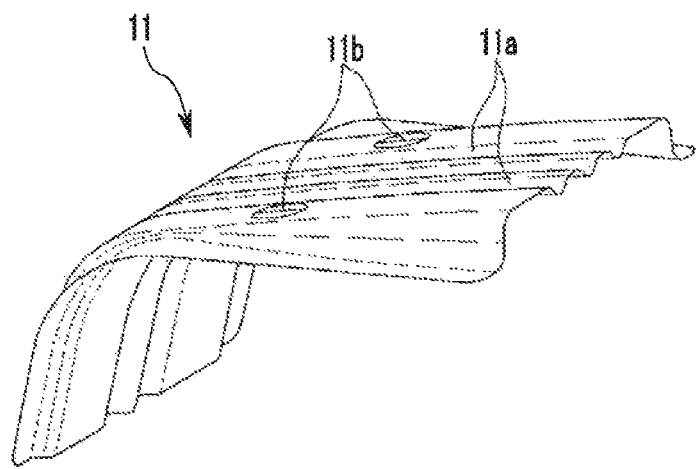
FIG. 2 is a perspective view of coupling of a gusset unit according to an exemplary embodiment of the present invention.
Figure 2:
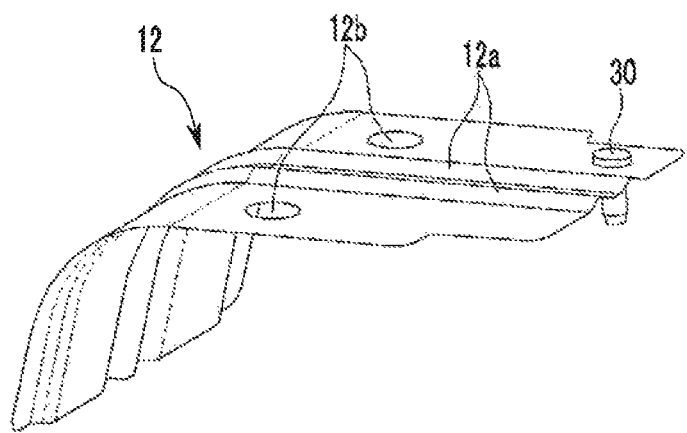
Figure 3:
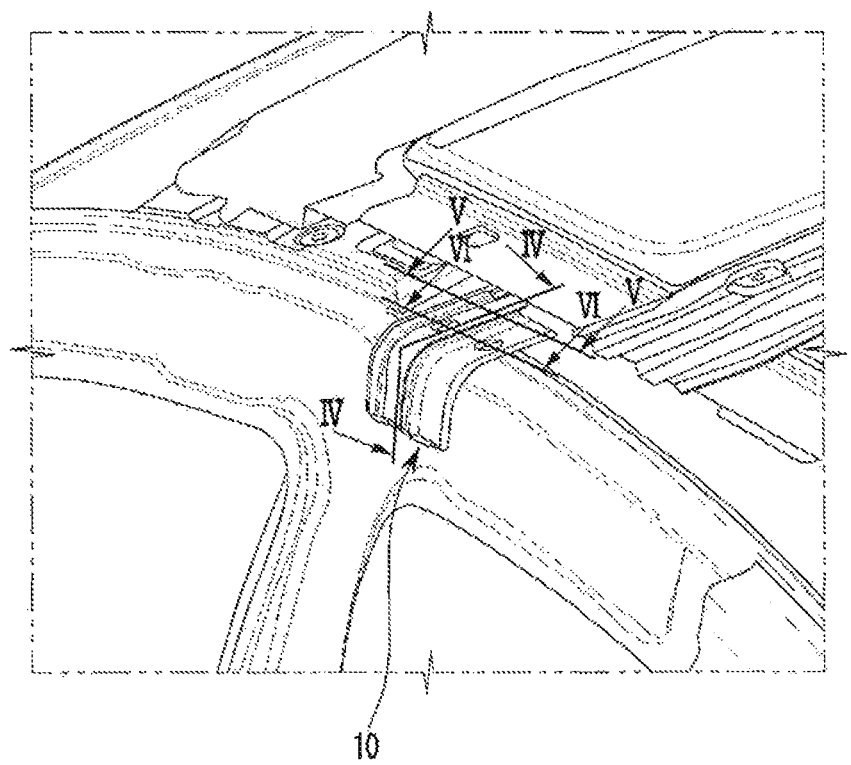
FIG. 3 is a perspective view of a lower portion in a state where a gusset unit according to an exemplary embodiment of the present invention is mounted to a connection portion of a center pillar and a roof panel.
Figure 4:
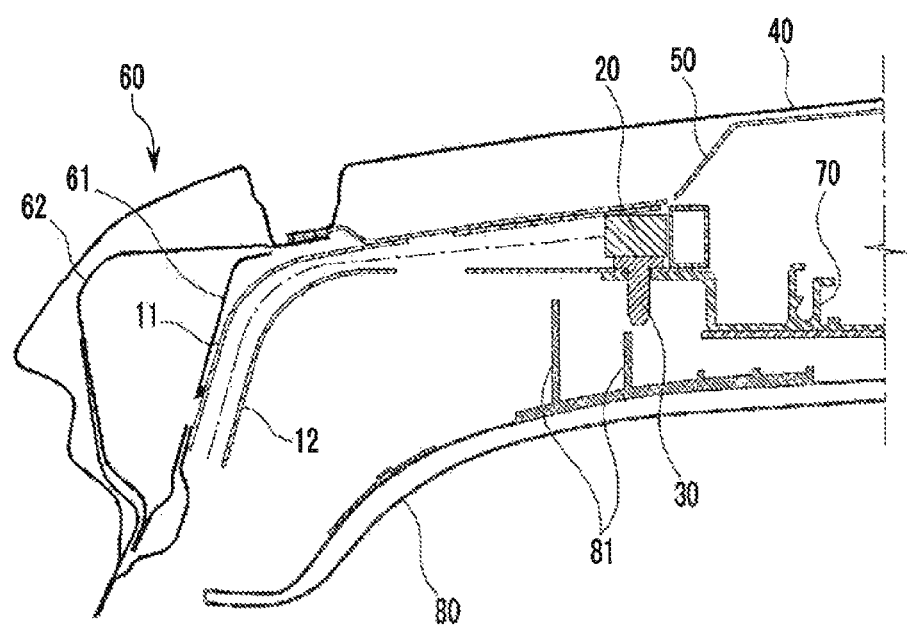
FIG. 4 is a cross-sectional view taken along line IV-IV of FIG. 3.
Figure 5:
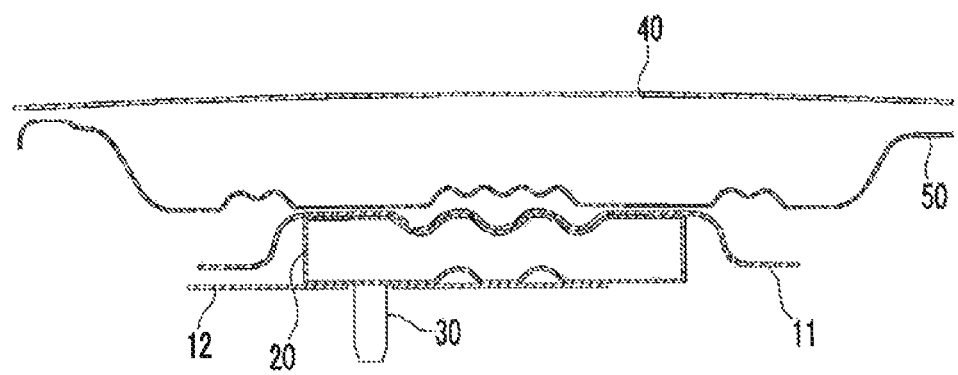
FIG. 5 is a cross-sectional view taken along line V-V of FIG. 3.
Figure 6:
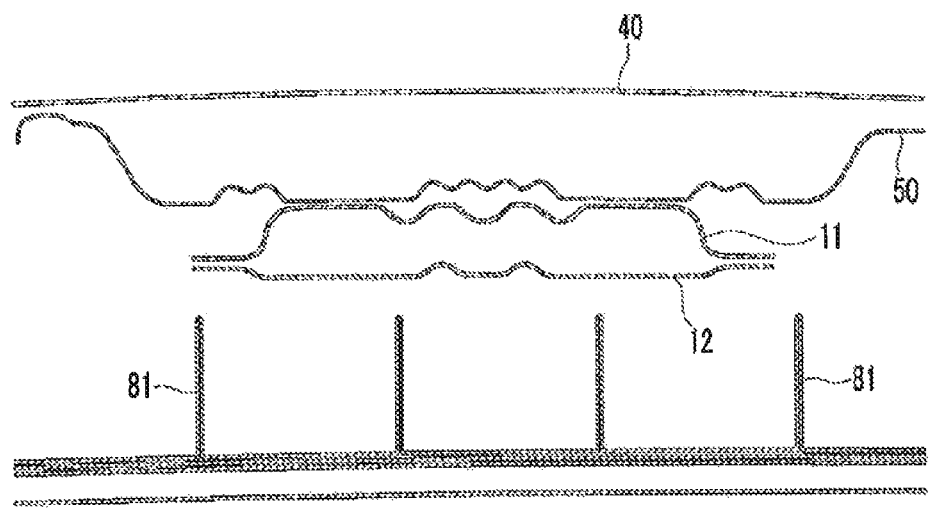
FIG. 6 is a cross-sectional view taken along line VI-VI of FIG. 3.

Referring to FIGS. 1 and 2, a gusset unit 10 according to an exemplary embodiment of the present invention includes an upper gusset 11 and a lower gusset 12 which are separately manufactured.

The upper gusset 11 and the lower gusset 12 general have a shape of a rectangular bracket and are smoothly bent downwardly.

The upper gusset 11 and the lower gusset 12 include a plurality of beads 11a and a plurality of beads 12b extending in a longitudinal direction and continuing in a width direction, respectively.

The respective beads 11a and 12a serve to enhance strength of the upper gusset 11 and the lower gusset 12.

The upper gusset 11 and the lower gusset 12 include two coupling holes 11b and 12b disposed at a predetermined interval in the width direction and passing through in a thickness direction, respectively.

The upper gusset 11 overlaps the lower gusset 12 so that the gusset unit 10 is formed.

The coupling holes 11b and 12b are formed at the upper gusset 11 and the lower gusset 12 so that the coupling holes 11b and 12b communicate with each other when the upper gusset 11 overlaps the lower gusset 12.

A foaming pad 20 is interposed between one tip end of the upper gusset 11 and one tip end of the lower gusset 12.

The foaming pad 20 includes embossing generally formed in a rectangular convex shape and inserted in the beads 11a and 12a.

The foaming pad 20 is made of a material having excellent elasticity and serves to absorb and relieve impact.

A coupling bolt 30 passes through the lower gusset 12 to be coupled to the one tip end of the lower gusset 12.

Referring to FIGS. 3 to 6, a ring reinforcement member 50 is attached to a roof panel 40 forming the roof of the vehicle. The ring reinforcement member 50 is attached to the roof panel 40 so that a closed section is formed between the ring reinforcement member 50 and the roof panel 40.

A center pillar 60 positioned at a center among the plurality of pillars formed so as to extend in the height direction of the vehicle and arranged in the longitudinal direction of the vehicle is connected to an edge of the roof panel 40 to which the ring reinforcement member 50 is attached.

The center pillar 60 includes a center pillar inner panel 61 to which the upper gusset 11 is attached and a side outer reinforcement panel 62 bonded to the center pillar inner panel 61 so as to form the closed section.

The upper gusset 11 is attached to a lower surface of the ring reinforcement member 50 in the height direction of the vehicle and the center pillar inner panel 61 to overlap a connection portion between the roof panel 40 and the center pillar 60.

The lower gusset 12 is fastened to a tip end of a sun roof track mechanism 70 through the coupling bolt 30 while overlapping the tip end of the sun roof track mechanism 70 to be coupled.

As described above, the gusset unit 10 is attached over the roof panel 40 and the center pillar 60 while overlapping the connection portion between the roof panel 40 and the center pillar 60, so that strength of connection between the roof panel 40 and the center pillar 60 is improved, thereby suppressing deformation of the roof when a side crash of the vehicle occurs and effectively responding to the side crash of the vehicle.

Further, the tie end of the sun roof track mechanism 70 is fastened to the gusset unit 10 to be supported, thereby improving mounting strength of the sun roof 70.

Further, a headlining 80 forming the interior of the vehicle room is disposed at a lower portion of the gusset unit 10 in the height direction of the vehicle, and a plurality of ribs 81 conforming to the FMH regulations protruding upwardly the height direction of the vehicle is installed in the headlining 80.

The foaming pad 20 embedded in the gusset unit 10 absorbs and relieves impact power transmitted to the gusset unit 10 through the headlining 80 when a body of a dummy bumps into the headlining 80 in a crash test of a vehicle, so that a value of FMH HIC is decreased, thereby improving crash stability of a passenger.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An upper vehicle body structure of a vehicle with a sun roof in which an edge of a roof panel at which the sun roof is installed is connected to a center pillar positioned at a center among a plurality of pillars formed to extend in a height direction of the vehicle and arranged in a longitudinal direction of the vehicle, the upper vehicle body structure comprising:
   a ring reinforcement member attached to the roof panel so as to form a closed section with the roof panel;
   a gusset unit mounted under the center pillar and the ring reinforcement member;
   wherein the sun roof is connected to the roof panel,
   wherein the gusset unit is mounted under the ring reinforcement member and the center pillar so as to underlap a connection portion at which an edge of the roof panel is connected with the center pillar,
   wherein the gusset unit includes:
      an upper gusset mounted to the ring reinforcement member and the center pillar; and
      a lower gusset coupled to the upper gusset and to a sun roof track mechanism,
   wherein a foam pad is interposed between one tip end of the upper gusset and one tip end of the lower gusset,
   wherein the one tip end of the lower gusset is connected with the sun roof track mechanism, and
   wherein the one tip end of the upper gusset is connected with the ring reinforcement member.

2. The upper vehicle body structure of claim 1, wherein the upper gusset and the lower gusset are coupled to each other so as to form a closed section.

3. The upper vehicle body structure of claim 1, wherein each of the upper gusset and the lower gusset includes a plurality of beads formed in a longitudinal direction thereof.

4. The upper vehicle body structure of claim 1, wherein the sun roof track mechanism is fastened to the lower gusset by a coupling bolt.

5. The upper vehicle body structure of claim 1,
   wherein the center pillar includes a center pillar inner panel and a side outer reinforcement panel coupled outside the center pillar inner panel so as to form a closed section with the center pillar inner panel;
   wherein the upper gusset is mounted to the center pillar inner panel inside thereof; and
   wherein a headlining is installed at a lower portion of the lower gusset in the height direction of the vehicle, and a plurality of ribs is installed in the headlining.

6. The upper vehicle body structure of claim 1, wherein coupling holes are formed to the upper gusset and the lower gusset to communicate with each other when the upper gusset overlaps the lower gusset.

* * * * *